(12) United States Patent
Saylor et al.

(10) Patent No.: US 9,154,486 B1
(45) Date of Patent: Oct. 6, 2015

(54) SECURING LUGGAGE

(71) Applicant: MicroStrategy Incorporated, Vienna, VA (US)

(72) Inventors: Michael J. Saylor, Vienna, VA (US); Konstantin Angelov, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 113 days.

(21) Appl. No.: 13/875,076

(22) Filed: May 1, 2013

Related U.S. Application Data

(60) Provisional application No. 61/785,593, filed on Mar. 14, 2013.

(51) Int. Cl.
*G06F 7/04* (2006.01)
*H04L 29/06* (2006.01)

(52) U.S. Cl.
CPC ..................... *H04L 63/08* (2013.01)

(58) Field of Classification Search
CPC .......... H04L 63/08; G06F 21/31; G06F 21/32
USPC ......................................... 726/7, 34; 713/168
See application file for complete search history.

(56) References Cited

U.S. PATENT DOCUMENTS

| | | | |
|---|---|---|---|
| 5,977,876 A | 11/1999 | Coleman | |
| 6,862,576 B1 * | 3/2005 | Turner et al. | 705/26.8 |
| 7,520,419 B2 * | 4/2009 | Libin et al. | 235/375 |
| 2007/0247276 A1 * | 10/2007 | Murchison et al. | 340/5.2 |
| 2009/0226050 A1 * | 9/2009 | Hughes | 382/124 |
| 2010/0071424 A1 * | 3/2010 | Tsuruta | 70/91 |
| 2012/0109419 A1 * | 5/2012 | Mercado | 701/2 |
| 2013/0127593 A1 * | 5/2013 | Kuenzi et al. | 340/5.61 |
| 2014/0002239 A1 * | 1/2014 | Rayner | 340/5.61 |

OTHER PUBLICATIONS

'AssaAbloy.com' [online]. "Assa Abloy Mobile Keys at ISC West Las Vegas," Apr. 2011, [retrieved on May 21, 2012]. Retrieved from the Internet: URL<http://www.assaabloy.com/en/com/Press-News/News/2011/ASSA-ABLOY-Mobile-Keys-Platform-Debuts-at-ISC-West/>. 2 pages.

'AssaAbloy.com' [online]. "Bjorn Hellgren unlocks his hotel room with Assa Abloy Mobile Keys, " May 2011, [retrieved on May 21, 2012]. Retrieved from the Internet: URL<http://www.assaabloy.com/en/com/Press-News/News/2011/The-customer-experience-of-ASSA-ABLOY-Mobile-Keys/>. 2 pages.

'AssaAbloy.com' [online]. "CSMA highlights Assa Abloy NFC mobile keys solutions," 2012, [retrieved on May 21, 2012]. Retrieved from the Internet: URL<http://www.assaabloy.com/en/com/Press-News/News/2012/NFC-access-control-highlighted-by-GSMA-at-Mobile-World-Congress/>. 2 pages.

'AssaAbloy.com' [online]. "Keyless entry with Assa Abloy mobile keys for secure and environment friendly access control," 2011, [retrieved on May 21, 2012]. Retrieved from the Internet: URL<http://www.assaabloy.com/en/com/Products/ASSA-ABLOY-Mobile-Keys/>. 2 pages.

(Continued)

*Primary Examiner* — Samson Lemma
(74) *Attorney, Agent, or Firm* — Fish & Richardson P.C.

(57) ABSTRACT

A lockable piece of luggage that may be unlocked with user credentials from a client device is disclosed.

20 Claims, 7 Drawing Sheets

(56) References Cited

OTHER PUBLICATIONS

'AssaAbloy.com' [online]. "New generation of access control and mobile access control with NFC technology Assa Abloy," Sep. 2011, [retrieved on May 21, 2012]. Retrieved from the Internet: URL<http://www.assaabloy.com/en/com/Press-News/News/2011/NFC-enabled-mobile-access-in-a-physical-access-control-world/>. 2 pages.
"Evaluation of the world's first pilot using NFC phones for check-in and hotel room keys," Report, ASSA ABLOY, retrieved on May 21, 2012, 6 pages.
'GadgetVenue.com' [online]. "Mobile phone car key," Oct. 2008, [retrieved on May 21, 2012]. Retrieved from the Internet: URL<http://www.gadgetvenue.com/mobile-phone-car-key-10011618/>. 3 pages.
Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.
Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.
Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.
Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.
Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_infrastructure>, 6 pages.
Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.
Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

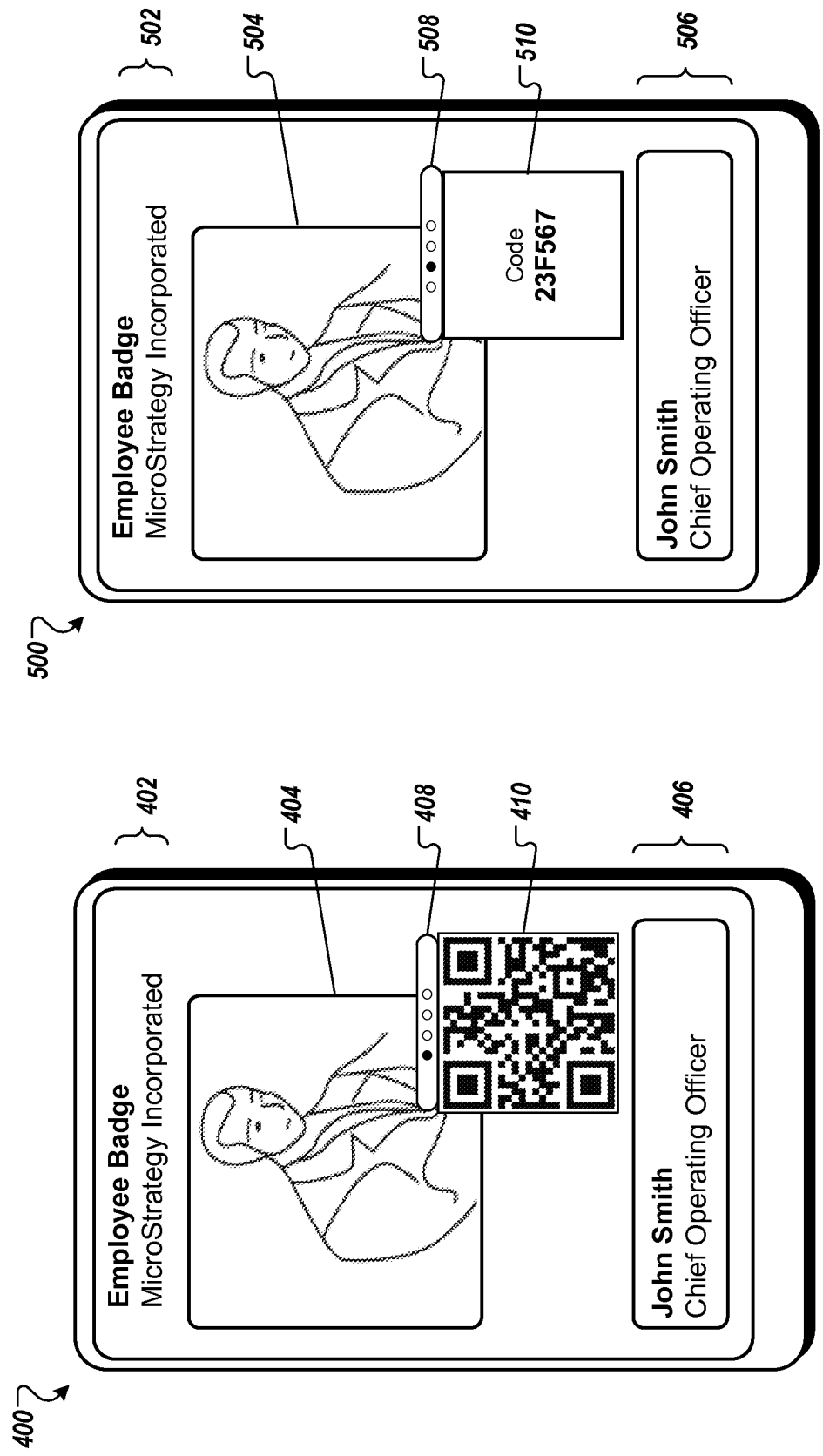

SECURING LUGGAGE

CROSS-REFERENCE TO RELATED APPLICATION

This application claims the benefit of U.S. Patent Application Ser. No. 61/785,593, filed on Mar. 14, 2013, which is incorporated herein by reference in its entirety.

TECHNICAL FIELD

This specification generally relates to securing luggage.

BACKGROUND

Some conventional briefcases include security devices that permit a user to lock and unlock the briefcases.

SUMMARY

In general, one aspect of the subject matter described in this specification may include the action of receiving, at a processing system housed within a piece of luggage, a representation for a credential from a client device. The actions may also include transmitting a validation request to a server, the validation request including data derived from the representation for the credential. Additionally, the actions may include receiving a validation response from the server indicating that the credential is valid, and in response to receiving the validation response, outputting an unlock signal, wherein the unlock signal causes an actuator to unlock a locking device coupled to the luggage. In some implementations, the representation for the credential may be an optical machine-readable representation, a sound signal representing the credential, an electromagnetic signal representing the credential, a near-field communications signal representing the credential, or an alphanumeric code for the credential.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 4 is an illustration of an example user interface on a client device that provides an optical machine readable representation for a credential.

FIG. 5 is an illustration of an example user interface on a client device that provides an alphanumeric code representing a credential.

DETAILED DESCRIPTION

Figure 1:
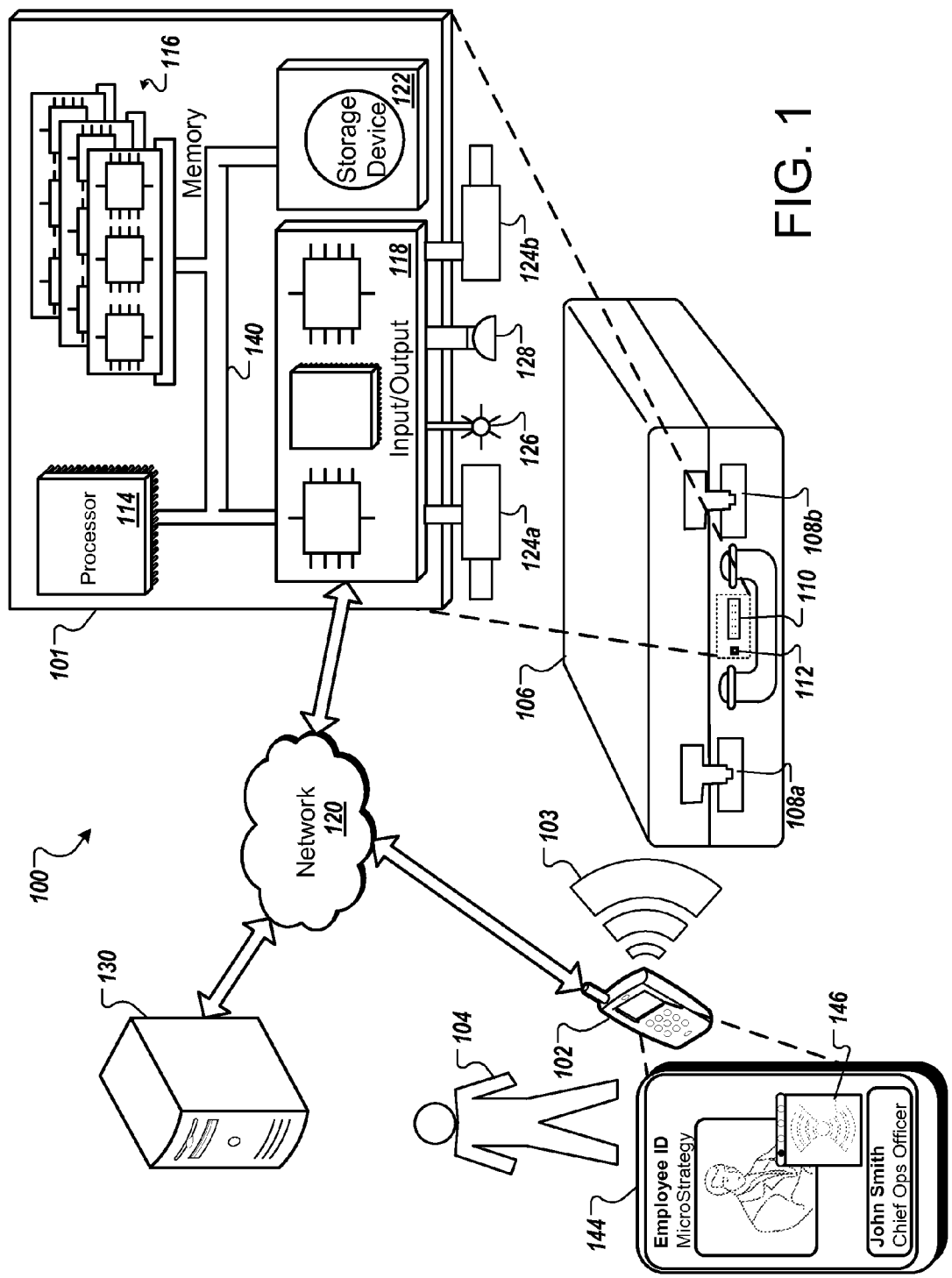
FIG. 1 is an illustration of an example system for securing luggage with user credentials.

In some instances, representations of credentials for groups of users or individuals are generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., on a briefcase), etc. Some credentials may be used for more than one purpose.

In particular, lockable luggage (e.g., briefcases, suitcases, etc.) may include a processing system that is configured to interface with client device-based credentials. The processing system may therefore permit access to the luggage when valid credentials are presented at the luggage. For example, when operated by a user, a client device may present a representation of a credential to an input device at the luggage in order to unlock the luggage. Responsive to successful validation of the credential, the luggage may be unlocked.

Credentials can be maintained on and/or accessed from client devices (e.g., mobile computing devices like smart phones and tablet computers) and credentials can be represented in various forms. A server, or collection of servers, can manage and distribute credentials to appropriate users' client devices. Users may then operate the client devices to present representations of the credentials, which can be validated using suitable mechanisms.

Examples of different representations for credentials and mechanisms for validating the different representations will now be described with reference to a system for securing luggage. In certain implementations, credentials can be represented by alphanumeric codes, optical machine-readable representations (e.g., QR codes), sound signals, electromagnetic signals (e.g., visible light, infrared (IR), etc.), and/or near-field communication (NFC) signals.

A first form of representation for a credential is an alphanumeric code. As referred to herein, an alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices.

To validate an alphanumeric code, a user presents the alphanumeric code to a validating device (e.g., a processing system housed within a piece of luggage). For example, the user may enter the alphanumeric code using a keypad on a briefcase, which then transmits the code to the validating device. The validating device may validate the alphanumeric code by transmitting a validation request message, which includes the alphanumeric code, to the server. When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server sends the validating device a validation response indicating that the representation for the credential was valid (e.g., the presented alphanumeric code matches a valid alphanumeric code for the credential and the credential holder is authorized to unlock the luggage). In turn, the validating device may then send a signal to unlock the luggage.

Another form of representation for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a quick response (QR) code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. An optical scanner or camera arranged on a piece of luggage can scan the portion of the client device's display showing the representation of the credential and transmit the representation to a validating device (e.g., a processing system within the luggage). The validating device can then decode the representation of the credential to generate a set of alphanumeric characters that were encoded in the representation of the credential.

The validating device may use any suitable mechanism to decode the optical machine-readable representation of the credential. For example, the validating device may access a function or library routine that captures and decodes QR codes and/or barcodes using a camera operatively coupled to the validating device. Suitable libraries may include, for example, RedLaser or Zxing.

In some implementations, the validating device may then validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the representation for the credential was valid (e.g., the alphanumeric characters in the request match a valid sequence of alphanumeric characters for the credential and the credential holder is authorized to unlock the luggage). In turn, the validating device may then send a signal to unlock the luggage.

Alternatively or in addition, a validating device may validate a set of alphanumeric characters from an optical machine-readable representation locally without requiring interaction with a server. For example, the optical machine-readable representation for the credential may include a digital signature generated using a digital signature algorithm that generates the digital signature based on data derived from the credential and a private key of the credential grantor. The validating device may then access a public key of the credential grantor to validate the digital signature using the digital signature algorithm.

Yet another form of representation for a credential is a sound signal. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including or representing a corresponding credential identifier and any other suitable data. In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The client device can then output the sound signal representation of the credential from a speaker coupled to the client device for reception by a validating device.

To initiate the validation process for a sound signal, a client device outputs a sound signal representing a credential. A validating device (e.g., a processing system within a piece of luggage) may then receive the sound signal via a speaker coupled to the validating device, and decode the sound signal to generate a set of alphanumeric characters that were encoded in the sound signal. The validating device may use any suitable mechanism to receive and decode the sound signal.

In some implementations, the validating device may then validate the sound signal by transmitting a validation request message to a server. The validation request message may include data corresponding to the alphanumeric characters that were encoded in the sound signal. When the server receives the validation request message, it attempts to confirm that the presented sound signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the sound signal was valid (e.g., the alphanumeric characters in the request match a valid sequence of alphanumeric characters for the credential and the credential holder is authorized to unlock the luggage). In turn, the validating device may then send a signal to unlock the luggage.

Alternatively or in addition, a validating device may validate a set of alphanumeric characters from a sound signal locally without requiring interaction with a server. For example, the sound signal may include a digital signature generated using a digital signature algorithm that generates the digital signature based on data derived from the credential and a private key of the credential grantor. The validating device may then access a public key of the credential grantor to validate the digital signature using the digital signature algorithm.

An electromagnetic signal (e.g., visible light, IR, etc.) representing a credential may encode data including or representing a corresponding credential identifier and any other suitable data. In addition, an electromagnetic signal representing a credential may encode another identifier that is linked to or otherwise associated with a corresponding credential identifier. In some implementations, a given electromagnetic signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate an electromagnetic signal, a client device may use any suitable technique for encoding a representation of a credential. For example, the client device may call a function or library routine that encodes data into electromagnetic signals. The client device can then output the electromagnetic signal representation of the credential from a light source (e.g., a visible light, IR, etc. light source) coupled to the client device for reception by a validating device. In some examples, the credential may be represented by a series of pulses of electromagnetic radiation where the data encoded within the electromagnetic signal may be reflected by the timing of the pulses.

To initiate the validation process for an electromagnetic signal, a client device outputs an electromagnetic signal representing a credential. A validating device (e.g., a processing system within a piece of luggage) may then receive the electromagnetic signal via a light-sensitive sensor (e.g., a camera, etc.), and decode the electromagnetic signal to generate a set of alphanumeric characters that were encoded in the electromagnetic signal. The validating device may use any suitable mechanism to receive and decode the electromagnetic signal.

In some implementations, the validating device may then validate the electromagnetic signal by transmitting a validation request message to a server. The validation request message may include data corresponding to the alphanumeric characters that were encoded in the electromagnetic signal. When the server receives the validation request message, it attempts to confirm that the presented electromagnetic signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the electromagnetic signal was valid (e.g., the alphanumeric characters in the request match a valid sequence of alphanumeric characters for the credential and the credential holder is authorized to unlock the luggage). In turn, the validating device may then send a signal to unlock the luggage.

Alternatively or in addition, a validating device may validate a set of alphanumeric characters from an electromagnetic signal locally without requiring interaction with a server. For example, the electromagnetic signal may include a digital signature generated using a digital signature algorithm that generates the digital signature based on data derived from the credential and a private key of the credential grantor. The validating device may then access a public key of the credential grantor to validate the digital signature using the digital signature algorithm.

Still another form of representation for a credential is a near field communication (NFC) signal. NFC as described herein is a set of standards (e.g., ECMA-340 and ISO/IEC 18092) for client devices to establish radio communication with each other by touching them together or bringing them into close proximity (e.g., within a few centimeters). NFC as described herein may also include other suitable short range wireless communication protocols such as Bluetooth or Zigbee.

A client device may use any suitable technique for encoding a representation of a credential within an NFC signal, such as a function or library routine. An NFC signal representing a credential may encode data including or representing a corresponding credential identifier and any other suitable data. In addition, an NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for an NFC signal, a client device transmits an NFC signal representing a credential. A validating device (e.g. a processing system within a piece of luggage) may then receive the signal at a wireless receiver coupled to the validating device and decode the NFC signal representing the credential to generate the set of alphanumeric characters encoded in the signal.

In some implementations, the validating device may then validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the NFC signal was valid (e.g., the alphanumeric characters in the request match a valid sequence of alphanumeric characters for the credential and the credential holder is authorized to unlock the luggage). In turn, the validating device may then send a signal to unlock the luggage.

Alternatively or in addition, a validating device may validate a set of alphanumeric characters from an NFC signal locally without requiring interaction with a server. For example, the sound signal may include a digital signature generated using a digital signature algorithm that generates the digital signature based on data derived from the credential and a private key of the credential grantor. The validating device may then access a public key of the credential grantor to validate the digital signature using the digital signature algorithm.

FIG. 1 shows an example system 100 for securing luggage with user credentials. As an overview, a user 104 who desires to unlock the luggage 106 may cause the user's client device 102 to output a representation of a credential to an input device 110 at the luggage 106. For example, the client device 102 may output a signal 103 (e.g., a sound signal) encoding a credential, and the input device 110 may be a microphone 128 that receives the signal 103. Additionally or alternatively, the client device 102 may output an electromagnetic signal representing the credential, and the input device 110 may be a light-sensitive sensor that receives the signal 103. The input device 110 then transmits the representation to a processing system 101 that is housed within the luggage 106. The processing system 101 may be configured for network connectivity and, therefore, may be capable of communicating with a credential management server 130 to validate the credential encoded in the signal 103. Upon successful validation of the credential, the processing system 101 sends a unlock signal to a locking assembly within the luggage. The locking assembly includes locking devices 108a, 108b (e.g., hasp-type locks) coupled to actuators 124a, 124b (e.g., linear solenoids), and is configured to unlock when it receives the unlock signal from the processing system 101.

Each component in the system 100 will now be described in more detail.

The client device 102 is configured to receive credentials associated with the user 104 and store them in any suitable memory for later retrieval. A given user 104 may be associated with multiple different credentials. Furthermore, some or all of the credentials associated with a user 104 may be accessible on a user's client device 102. In particular, a software application executing on the client device 102 can retrieve the credentials associated with user 104, so they can be used for generating and presenting a representation of the credential (e.g., to unlock luggage 106). The client device 102, may be any type of computing device, including, but not limited to, a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

When a user 104 desires to present a representation of a credential for validation, the user 104 may input a command into the client device 102 via a man-machine interface (e.g., a user interface on a presence-sensitive display). In response, an application executing on the client device 102 then generates and outputs the representation. In order to unlock the luggage 106, this representation should match the validation capabilities of the luggage 106. For example, if the user's client device 102 is in a sound signal or NFC signal output mode as illustrated in FIG. 1, then the luggage 106 should be capable of receiving and decoding a sound signal or NFC signal representing the credential. If the user's client device 102 is in an optical machine-readable representation output mode as illustrated in FIG. 4 and described further below, then the luggage 106 should be capable of receiving and decoding an optical machine-readable representation for the credential. In some implementations, the luggage 106 may be capable of receiving and validating several different types of representations (e.g., two or more of an optical machine-readable representation, an alphanumeric code, a sound signal, an electromagnetic signal, and a NFC signal).

In the example shown in FIG. 1, the client device 102 outputs a signal 103 (e.g., a sound signal) representing the user's credential. While described in FIG. 1 as a sound signal, the signal 103 alternatively may be a NFC signal and the input device 110 may be a wireless receiver. In some implementations, the client device 102 may output an optical machine-readable representation for a credential, an electromagnetic signal representation for the credential, or an alphanumeric code representing a credential. In such implementations, the input device 110 may be a camera or optical scanner, or a keypad. Client device 102 also provides a user interface 144. In particular, the client device 102 may show the user interface 144 while outputting a signal representing the user's credential for the purpose of attempting to access the luggage 106. The user interface 144 includes a graphic symbol 146 indicating that the client device 102 is outputting a signal representing the credential, as well as a caption indicating that the representation is an "Employee ID" for "MicroStrategy Incorporated." Also, the user interface includes an image of the employee, and the name and title of the employee ("John Smith, Chief Ops Officer").

Figure 3:
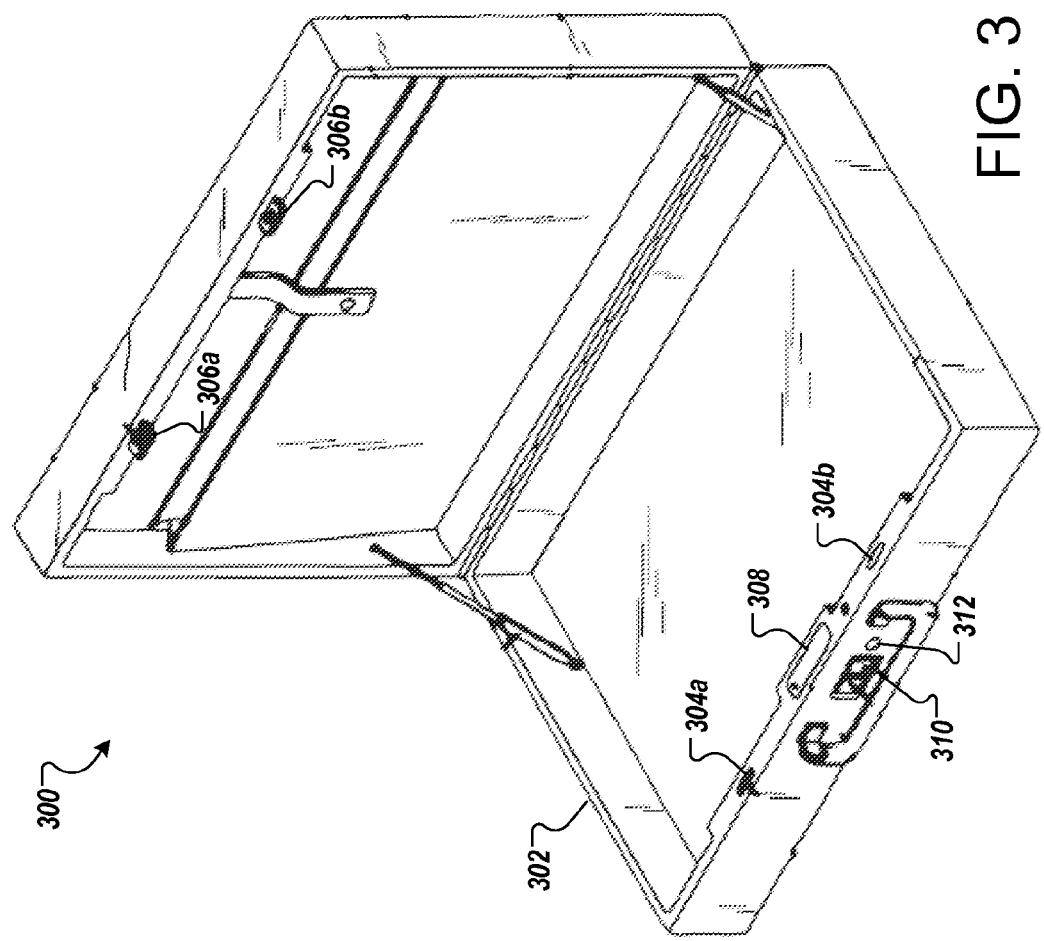
FIG. 3 is an illustration of an example briefcase that can be secured with user credentials.

The luggage 106 may be any form of lockable baggage, such as a briefcase or a suitcase. The luggage 106 includes an enclosure 107 and various components arranged on and within the enclosure 107. A locking assembly is arranged in the enclosure 107 that includes two locking devices 108a, 108b. These locking devices 108a, 108b may be spring-loaded, hinged hasp-type locks that are configured to be received and locked in place within openings included in the two spring-loaded locking devices. Alternatively, the locking devices may be any suitable locking mechanisms such as, for example, a set of apertured tabs on a front portion of the upper half of the luggage adapted to fit within a set of slots formed in a front portion of the lower half of the luggage as illustrated in FIG. 3. The locking devices also can be implemented as magnetic locks, electric strike locks, etc. The enclosure 107 also houses a set of actuators 124a, 124b. The actuators 124a, 124b may be any suitable electromechanical devices that can be mechanically coupled to the locking devices so as to unlock the locking assembly. For example, the actuators 124a, 124b may be linear solenoids, rotary solenoids, servo-motors, or stepper motors. The exterior of the enclosure 107 also has an input device 110 attached. The input device 110 may be a microphone 128 as shown in FIG. 1. Alternatively or in addition, the input device 110 may include one or more of a wireless receiver, an optical scanner, a camera, or a keypad. The enclosure 107 may also include an LED 112 to indicate the status of validating any credentials presented to the input device 110.

The processing system 101 housed within the luggage may be any suitable combination of one or more processors coupled to memory devices that is capable of performing the necessary functions. The example processing system 101 includes a processor 114, a memory 116, a storage device 122, and an input/output device 118. Each of the processor 114, the memory 116, the storage device 122, and the input/output device 118 are interconnected using a system bus 140. The processor 114 is capable of processing instructions for execution within the processing system 101. In some implementations, the processor 114 is a single-threaded processor. In some implementations, the processor 114 is a multi-threaded processor. The processor 114 may be included in a microcontroller or any other suitable system.

The processor 114 is capable of processing instructions stored in the memory 116 or on the storage device 122 to perform various operations. In particular, the processor 114 is configured to receive and decode a representation for a credential from the input device 110 (e.g., microphone 128). The processor 114 is also capable of validating the representation by communicating with the server 130, for example, via the input/output device 118 and the network 120. The processor 114 may also output an indication that validation is in process, for example by driving the LED 112 to flash, change colors, or otherwise signal the user via the input/output device 840. The processor 114 may also send an unlock signal to the actuators 124a, 124b, thereby causing the locking devices 108a, 108b on the luggage 106 to be unlocked. For example, the unlock signal may be a digital or analog electrical signal capable of driving the actuators.

In some implementations, the processor 114 may also be configured to perform off-line credential validation. Such off-line credential validation does not require a concurrent network connection to the server 130 in order to validate credentials. Rather, to perform validation, the processor 114 may retrieve a valid representation for a credential from memory 116 and/or storage device 122, and then confirm that the representation for the credential received from the client device 102 matches the representation retrieved from memory 116 and/or storage device 122. In some aspects, a set of representations for credentials may be stored in memory 116 and/or storage device 122. An identical set of representations for credentials may also be stored on the client device 102. The client device 102 and the processing system 101 may be configured to cycle through the same sequence of representations for credentials in a synchronized manner such that the representation output by the client device 102 would match the current representation at the processing system 101. For example, a clock at the client device 102 and the processing system 101 could be synchronized (or substantially synchronized) and the representations at the client device 102 and the processing system 101 could be rotated based on a predefined clock time. For example, the representations could progress through a predefined sequence that involves selecting a new value on an hourly basis at both the client device 102 and the processing system 101. To maintain synchronization, the client device 102 and the processing system 101 may periodically synchronize with a network server, for example, using a network time protocol.

In some implementations involving off-line validation, the processor 114 may periodically download a credential revocation list from the server 130 and store the list in memory 116 or storage device 122. For example, the processor 114 may download a credential revocation list daily, weekly, or monthly when network access is available. When the processor 114 validates a credential in the off-line mode, the processor 114 can verify that the credential is not listed in the credential revocation list, and, therefore, confirm that the credential has not been revoked.

In some implementations involving off-line validation, the representation for the credential provided by the client device 102 may include a digital signature derived from a private key of a credential grantor (e.g., the employer or luggage retailer) and a portion of the data from the credential. For example, the digital signature may be generated by encoding one or more components of the credential (e.g., the credential identifier, the user name, the user title, etc.) using a suitable digital signature algorithm and the private key of the credential grantor. Suitable algorithms may include the Rivest, Shamir, Adleman (RSA) algorithm or the digital signal algorithm (DSA). When the processor 114 determines that the data corresponding to the credential includes a digital signature, it can access a public key of the credential grantor. For example, the processor 114 may retrieve the public key from the memory 116 and/or the storage device 122. In some implementations, the processor 114 may periodically receive updates to a library of public keys for credential grantors. The processor 114 can then validate the credential by authenticating the digital signature using the public key of the credential grantor and the digital signature algorithm used to encode the original digital signature.

In some implementations, some or all of the functions of the processing system 101 may be performed by an additional client device (e.g., a mobile computing device like a smart phone or tablet computer) (not shown) that is housed within the luggage. For example, a user may have an additional client device that may be stored within the luggage 106. This additional client device may be coupled to an input/output device 118 within the luggage, and may provide the functions of the processor 114.

The memory 116 stores information within the processing system 101. In some implementations, the memory 116 is a computer-readable medium. In some implementations, the memory 116 is a volatile memory unit. In some implementations, the memory 116 is a non-volatile memory unit.

The storage device 122 is capable of providing mass storage for the processing system 101. In some implementations, the storage device 122 is a computer-readable medium. In various different implementations, the storage device 122 may be a floppy disk device, a hard disk device, an optical disk device, or a tape device.

The input/output device 118 provides input/output operations for the processing system 101. For example, the input/output device 118 may include a network interface. The input/output device 118 also may include a driver (e.g., a digital to analog converter) to control the LED 112 and/or an analog to digital converter to receive input from the microphone 128. The input/output device 118 may further include a driver (e.g., a digital to analog converter or digital output) to control the actuators 124a, 124b. In some implementations, the input/output device 118 may be configured to receive input from an optical scanner, a camera, or a keypad. In addition, the input/output device 118 may be configured to drive an LED display on the exterior or interior of the luggage 106 (not shown) to provide a graphical information to the user 104.

The server 130 communicates via a network 120 with the client device 102 and the processing system 101. As illustrated in FIG. 1, when the user 104 attempts to unlock the luggage 106, the user 104 operates the client device 102 to present a representation of a credential to the input device 110 of the luggage 106. The processing system 101 then may validate the credential by communicating with the server 130 as described above. Once the processing system 101 has validated the credential, the processing system 101 sends an unlock signal to the actuators 124a, 124b, thereby causing the locking devices 108a, 108b on the luggage 106 to unlock.

The server 130 manages and/or stores one or more credentials, associates users and groups of users with appropriate credentials, and provides the credentials to users' client devices and/or processing systems (e.g., operated by credential authorities) for validation. The server 130 can be any suitable computer or collection of computers executing software capable of managing, distributing, and/or validating representations of credentials for users and groups of users via a network 120 as described herein.

Credentials, user accounts, group accounts, and administrative accounts can be stored in a database (e.g., MySQL, PostgreSQL, MS SQL Server, MongoDB), or other suitable data structure that can be accessed by the server 130. In some implementations, the server 130 may access the stored credentials and/or user accounts via web services such as representational state transfer (REST) style services.

Initially, the server 130 creates a credential based on input provided by a credential grantor (e.g., an employer or luggage retailer). In some implementations, multiple different credential grantors (e.g., different entities and/or organizations) may issue credentials using the same server 130. The credential may include a variety of information such as a credential identifier (e.g., a number or alphanumeric character string that uniquely identifies a credential), an indication of the grantor of the credential, information about the user to whom the credential grantor granted the credential, an indication of one or more permissions granted by the credential grantor to the user, a description of a specific piece of luggage associated with the credential, etc.

The server 130 may present a suitable interface to the credential grantor for creation of credentials. For example, the server 130 may present a web interface through which grantors can interact via a Web browser. In other aspects, the server 130 may be directly accessible via a graphical-user interface or an application running on a mobile device. Any suitable interface can be used that enables the creation and storage of credentials, and user accounts. In addition (or as an alternative) to creation of credentials by credential grantors, credentials may be created at the request of registered users through a web-based or other interface, or through any other suitable mechanism such as sending email or short message service (SMS) transmissions to grantors. In some implementations, registered users may be able to create credentials by use of an application running on a client device.

The server 130 also may present an interface so that users and/or credential grantors can create user accounts for individual users and groups of users. For example, the server 130 may present a web interface through which credential grantors can interact via a Web browser. Additionally or alternatively, the server 130 may be directly accessible via a graphical-user interface or an application on a mobile device. User accounts may be stored in a table or collection of tables in a database, or in any other suitable data structure accessible by the server 130. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

Once credentials and users, or groups of users, have been created, credential grantors and/or users can associate the credentials with users, or groups of users. For example, the server 130 may present a web interface through which grantors can interact via a Web browser to link a given credential to a given user or group of users. In other aspects, the server 130 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 130 also may notify the users that they have been associated with the credential(s), for example by pushing notifications to the respective users' client devices. Such notifications may include the credential identifier for the user.

As an example, an employer (e.g., MicroStrategy Incorporated) may issue Mr. Smith a piece of luggage 106. The employer may create a new user account at the server 130 that includes a credential permitting Mr. Smith to access the luggage 106. In an alternative scenario, Mr. John Smith may purchase a new piece of luggage 106 from a retailer. At checkout, the retailer may request a new user account from the server 130 on behalf of the user 104. The server 130 can then create database entries representing a user account for Mr. Smith, where the user account includes a credential allowing Mr. Smith to unlock the luggage 106.

Once credentials have been associated with appropriate user and/or group accounts, the credentials can then be distributed to client devices for the appropriate users via the network 120. For example, the network 120 may be a local area network ("LAN") and/or a wide area network ("WAN"), e.g., the Internet. In some versions, the server 130 may communicate with the client devices via SMS or multimedia messaging service (MMS). The server 130 may access user accounts in a database to locate the appropriate users' client devices.

Figure 2A:
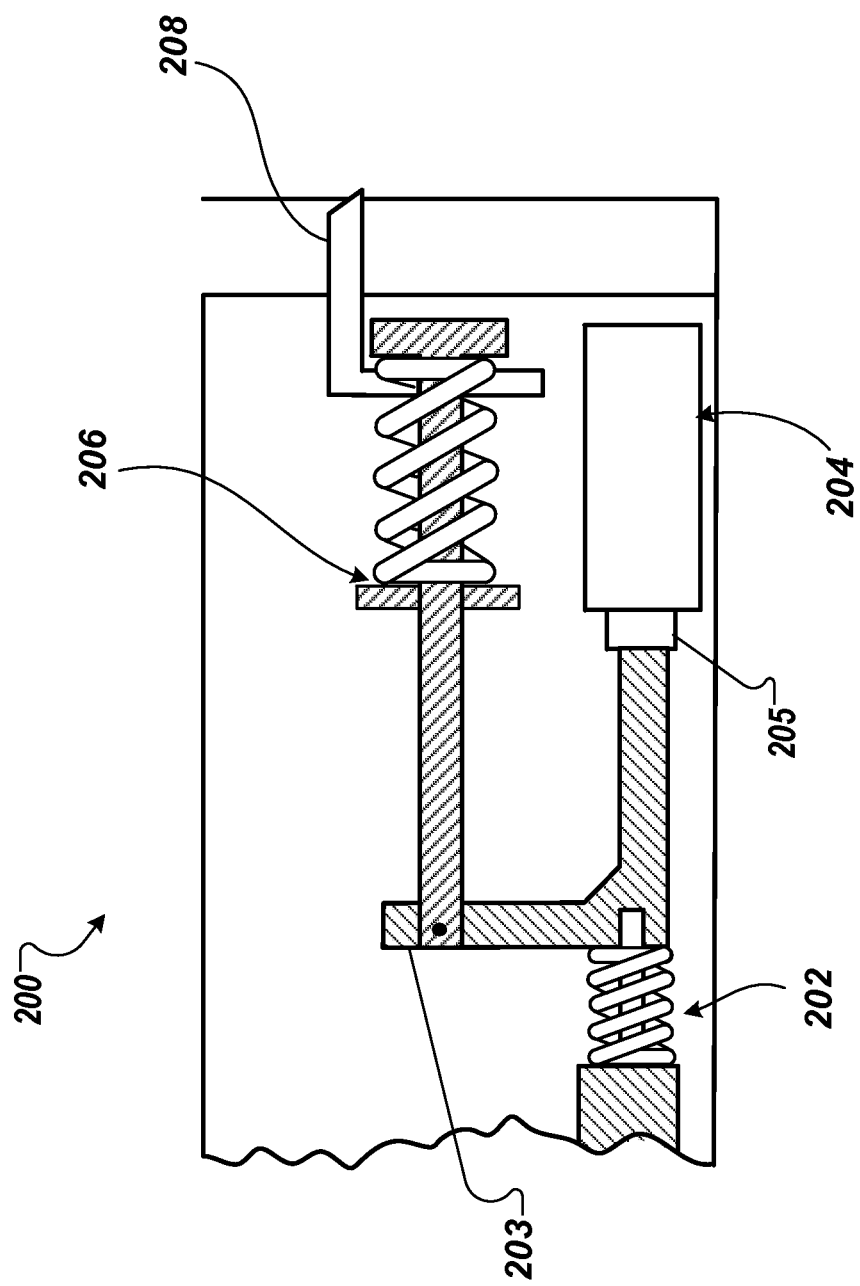
FIGS. 2A-2B are cutaway illustrations of an example locking assembly for luggage.
Figure 2B:
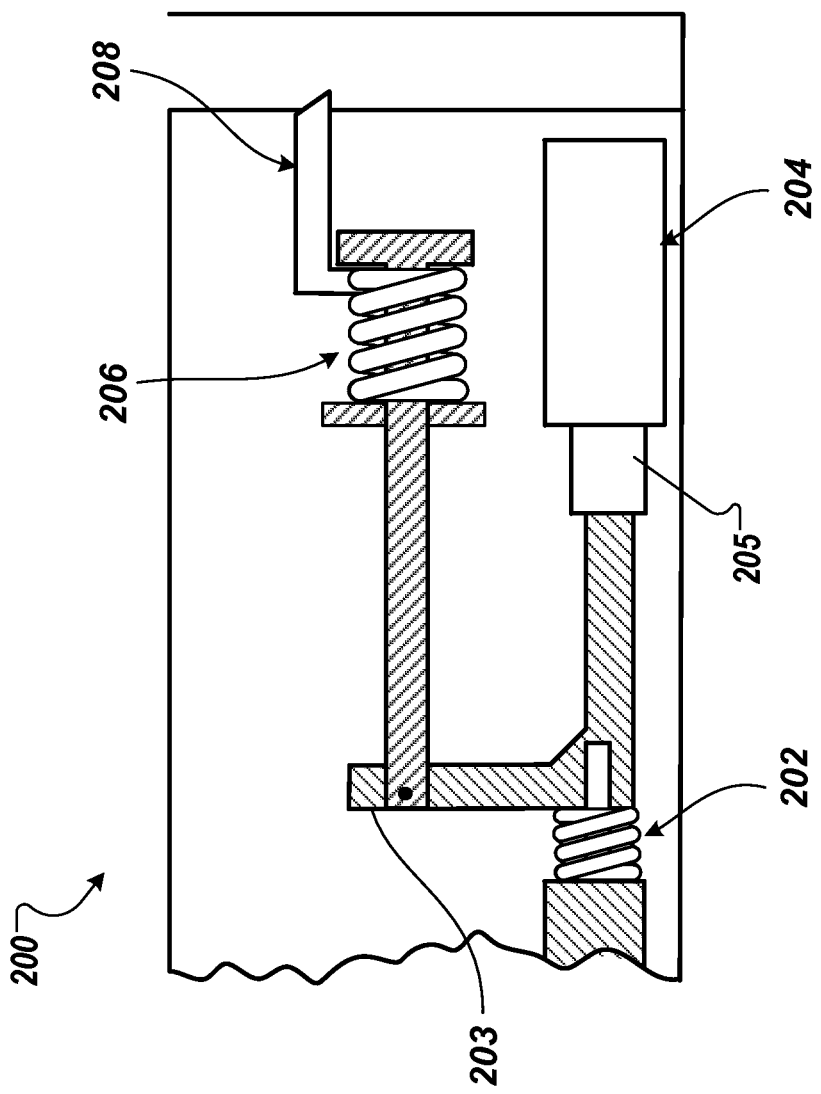

FIGS. 2A-2B show cutaway illustrations of an example locking assembly 200 for luggage (e.g., luggage 106 of FIG. 1). As illustrated in FIG. 2A, the locking assembly 200 may include spring-loaded latch bolts 208 that protrude into openings adapted to receive the ends of the hasp-type locks 108a, 108b. The latch bolts 208 may be attached to a push rod assembly 203, which is biased into a locked position via springs 206, 202. The locking assembly 200 also includes an actuator 204 (e.g., a linear solenoid) with plunger 205 arranged at one end of the push rod assembly 203. As shown in FIG. 2A, the linear solenoid 204 is deenergized and the plunger 205 is therefore fully retracted.

When the processing system 101 transmits an unlock signal, the linear solenoid 204 is energized, driving the plunger 205 into the end of the push rod assembly 203 as illustrated in FIG. 2B. As a result, the push rod assembly 203 compresses springs 202, 206, thereby causing the latch bolt 208 to retract. This frees the ends of the hasp type locks 108a, 108b from the openings of the locking assembly and causes the luggage 106 to be unlocked.

FIG. 3 shows an example briefcase 300 that can be secured with user credentials. Once the processing system 101 has validated credentials presented by the client device 102, the luggage 106 unlocks and opens as shown in FIG. 3. The briefcase 300 is similar to the briefcase 106 shown in FIG. 1 and includes an input device 310 and an LED 312. The briefcase 300 also includes a housing 308 to enclose the processing system 101. However, the briefcase 300 includes a locking assembly having a different configuration from that shown in FIG. 1, FIG. 2A, and FIG. 2B. In particular, the briefcase 300 includes a pair of tabs 306a, 306b having apertures therein, which are arranged at a front portion of the top half of the briefcase 302. The tabs 306a, 306b are configured to fit within slots 304a, 304b arranged at a front portion of the bottom half of the briefcase 303. The actuators (not shown) cause a pin to reciprocate within the apertures on the tabs 306a, 306b, thereby causing the locking assembly to lock and unlock under the control of the processing system 101.

FIG. 4 shows an example user interface 400 on a client device that provides an optical machine readable representation for a credential. For example, when a user selects the "MicroStrategy Employee Badge" 608 shown in FIG. 6, the selected badge 400 may be displayed on the client device. The badge 400 includes a caption 402 identifying it as an "Employee Badge" for "MicroStrategy Incorporated." Also included is an image of the user 404 and a caption 406 that identifies the associated user as "John Smith, Chief Operating Officer." The badge 400 further includes a swiping slider 408 that may enable a user to select between different representations for the credential. A representation for a credential may be a depiction or rendering corresponding to a credential that enables the credential to be validated. For example, in the current position, the slider 408 causes an optical-machine readable representation for the credential 410 (e.g., a QR code) to be displayed.

FIG. 5 shows an example user interface 500 on a client device of a third-party that provides an alphanumeric code representing a credential. The user interface 500 shows an alphanumeric code that the user's client device may provide to unlock the luggage. The user interface 500 includes a caption 502 indicating that the representation is an "Employee ID" for "MicroStrategy Incorporated," an image of the employee 504, and the name and title of the employee ("John Smith, Chief Operating Officer") in a caption 506. The user interface 500 also includes a slider 508 that enables the user to select from among different representations for the credential. In addition, the user interface 500 shows an alphanumeric code (i.e., "23F567") representing a credential 510. As described above, the user may enter this code into a keypad input device on the luggage, which then submits the code for validation.

Figure 6:
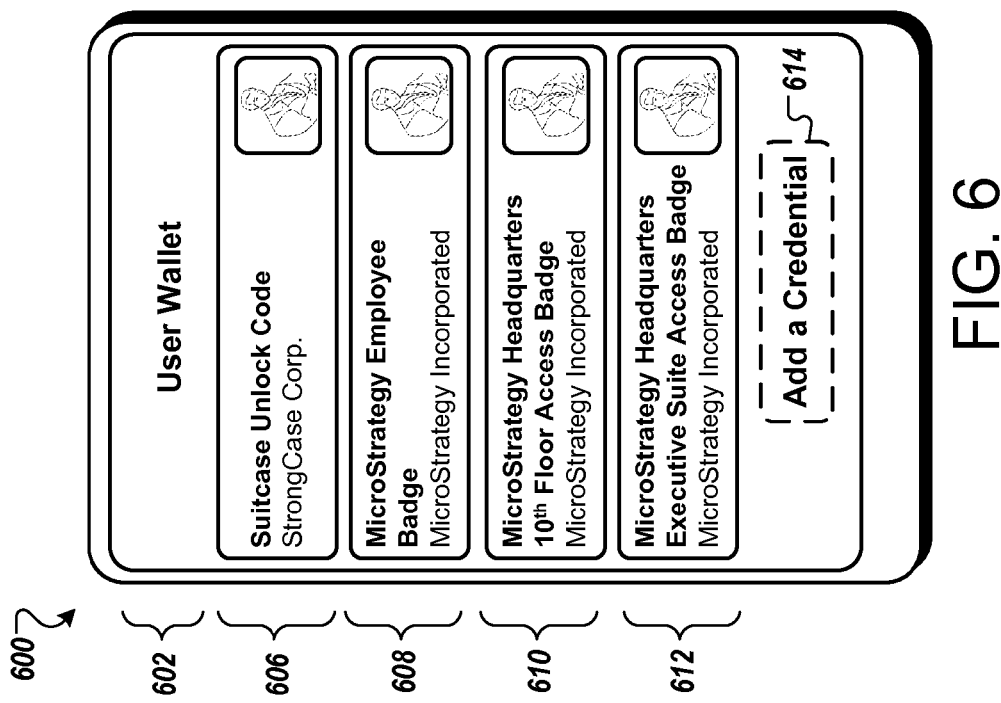
FIG. 6 is an illustration of an example of a user interface that enables a user to select from among various credentials.

FIG. 6 shows a sample user interface 600 that enables a user to select from among various credentials belonging to the user. In some implementations, the various credentials may be issued by different organizations. In particular, the user interface 600 includes an example of a user's wallet (identified with a "User Wallet" caption 602) that provides the user with access to numerous different credentials associated with the user. For example, the user interface 600 includes a "Suitcase Unlock Code" 606 issued by StrongCase, Corp., and a "MicroStrategy Employee Badge" 608, a "MicroStrategy Headquarters 10$^{th}$ Floor Access Badge" 610, and a "MicroStrategy Headquarters Executive Suite Access Badge" 612 issued by MicroStrategy Incorporated. The user can select any one of these credentials from the user's wallet to output a representation of the credential from the user's client device. The user may make the selection, for example, by touching the corresponding area on a presence-sensitive display of the client device. The user can also select an Edit command button 604 to modify settings associated with the credentials, and can add a credential to the wallet by selecting command button 614.

Figure 7:
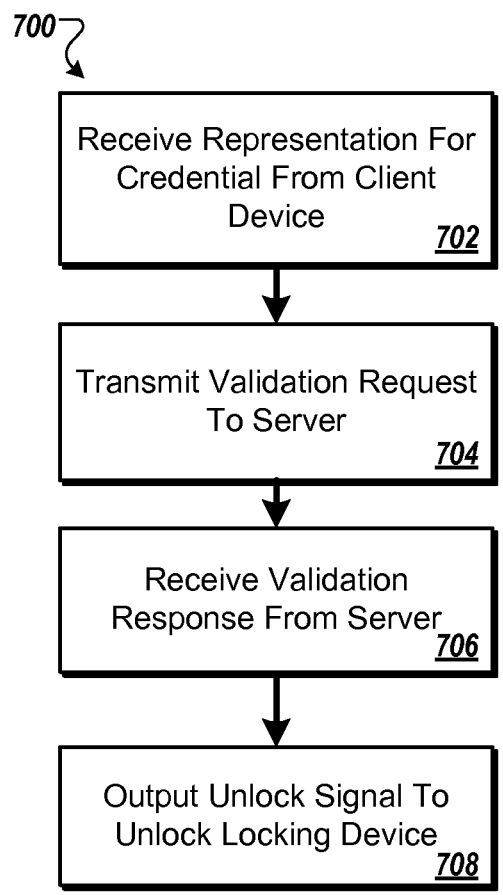
FIG. 7 is a flowchart of an example process for securing luggage with a user credential.

FIG. 7 shows an example process 700 for securing luggage with a user credential. The process 700 may be performed, for example, by the processing system 101 within the luggage 106 of FIG. 1. In step 702, a processing system receives a representation for a credential from a client device. The representation for the credential may be, for example, a sound signal, an electromagnetic signal, an NFC signal, an optical machine-readable representation for a credential, or an alphanumeric code representing the credential. The processing system may receive the representation from an appropriate input device arranged on the luggage. For example, the input device may be a microphone, a wireless receiver, an optical scanner, a camera, or a keypad as appropriate.

Next, in step 704, the processing system transmits a validation request to a server (e.g., server 130 from FIG. 1), where the validation request includes data derived from the representation for the credential. The data in the validation request may depend upon the type of representation received from the client device. For example, if the representation is a sound signal, an electromagnetic signal, or an NFC signal, the processing system may decode the representation to derive a set of alphanumeric characters. Likewise, if the representation is an optical machine-readable representation, the processing system may decode the representation to derive a set of alphanumeric characters. This set of alphanumeric characters may be included in the validation request. However, if the representation is an alphanumeric code, the processing system may include the alphanumeric code in the validation request without performing any decoding.

In response, the server transmits a validation response. The processing system receives the validation response indicating that the credential is valid in step 706. In step 708, the processing system then outputs an unlock signal that causes an actuator to unlock a locking device coupled to the luggage.

In some implementations, unlocking of the locking device coupled to the luggage may be conditioned upon the presentation of multiple valid representations of credentials to the processing system (e.g., within a defined window of time). For example, an individual user may present representations of two different credentials associated with the user (e.g., a government-issued identity credential and an employer-issued employee credential) to the processing system, and the processing system may request validation of the representations of the two credentials from the server. If the server responds indicating that the representations of both credentials are valid, the luggage may be unlocked. However, if one or both of the credentials are invalid, the luggage may not be unlocked.

Alternatively, two different users may present representations of two different credentials associated with the two users, respectively, to the processing system, and the processing system may request validation of the representations of the two credentials from the server. If the server responds indicating that the representations of both credentials are valid, the luggage may be unlocked. However, if one or both of the credentials are invalid, the luggage may not be unlocked.

In other implementations, unlocking of the locking device coupled to the luggage may be conditioned upon the presentation of multiple valid representations of the same credential to the processing system (e.g., within a defined window of time). For example, an individual user may present two representations of the same credential (e.g., a sound signal representation of the credential and an alphanumeric code representation of the credential) to the processing system, and the processing system may request validation of both representations of the credential from the server. If the server responds indicating that both representations of the credential are valid, the luggage may be unlocked. However, if one or both of the representations of the credential are invalid, the luggage may not be unlocked.

Additionally or alternatively, in some implementations, unlocking of the locking device coupled to the luggage may be conditioned upon the presentation of one or more biometric identifiers (e.g., a fingerprint, an iris or retina scan, a voice signature, etc.) in addition to the presentation of a valid representation of a credential to the processing system (e.g., within a defined period of time). In such implementations, the luggage may include or otherwise be coupled to an appropriate input mechanism for receiving the biometric identifier. For example, the luggage may include a fingerprint scanner (e.g., for receiving fingerprints), a camera (e.g., for receiving iris or retina scans), and/or a microphone (e.g., for receiving voice signatures). A user may present a representation of a credential as well as a biometric identifier of the user to the processing system, and the processing system may request validation of both the representation of the credential and the biometric identifier from the server. If the server responds indicating that both the representation of the credential and the biometric identifier are valid (e.g., that the representation of the credential is valid and the biometric identifier corresponds to the user represented by the credential), the luggage may be unlocked. However, if one or both of the representation of the credential and the biometric identifier are invalid, the luggage may not be unlocked.

In some implementations, unlocking of the locking device coupled to the luggage may be conditioned upon satisfaction of a location condition in addition or as an alternative to the other conditions described above. For example, a user may present a representation of a credential to the processing system, and the processing system may request validation of the representation of the credential from the server. In addition, the processing system may transmit an indication of a location of the luggage (e.g., geographic coordinates obtained from global positioning system (GPS) capabilities of the processing system) to the server. If the server responds indicating that the representation of the credential is valid and that the location of the luggage is within an allowed region, the luggage may be unlocked. However, if the representation of the credential is invalid or the location of the luggage is not within an allowed region, the luggage may not be unlocked. Alternatively, in some implementations, the processing system may enforce the location condition itself. In such implementations, the processing system may determine if the luggage is located within an allowed region (e.g., based on data obtained from GPS capabilities of the processing system) and cause the luggage to be unlocked responsive to receipt of an indication from the server that the representation of the credential is valid and a determination that the luggage is located within an allowed region. In contrast, the luggage may remain locked if the server indicates that the representation of the credential is invalid or the processing system determines that the luggage is not located within an allowed region.

Certain features described herein can be implemented in digital electronic circuitry, or in computer hardware, firmware, software, or in combinations of them. Certain apparatus described herein can be implemented in a computer program product tangibly embodied in an information carrier, e.g., in a machine-readable storage device, for execution by a programmable processor; and certain method steps can be performed by a programmable processor executing a program of instructions to perform functions of certain described implementations by operating on input data and generating output. Furthermore, certain described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, certain features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

Certain features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

For instance, in some implementations, a piece of luggage including a processing system and locking mechanisms as described herein may present a representation of a luggage identifier to a user who desires to gain access to the piece of luggage. For example, the piece of luggage may present the representation of the luggage identifier as an alphanumeric code, an optical machine-readable representation (e.g., a QR code), a sound signal, an electromagnetic signal (e.g., visible light, IR, etc.), and/or an NFC signal. The user who desires to gain access to the piece of luggage may receive the representation of the luggage identifier using a computing device (e.g., with an appropriate client application executing on the computing device), and the computing device may transmit an indication of the luggage identifier to a server along with an indication of the user associated with the computing device (e.g., a user identifier associated with the user and/or an indication of one or more credentials possessed by the user). The server then may determine if the user is authorized to access the luggage (e.g., based on one or more credentials possessed by the user and the indication of the luggage identifier). In the event that server determines that the user is authorized to access the piece of luggage, the server may transmit a communication to the processing system associated with the piece of luggage instructing the processing system to unlock the piece of luggage. In response, the processing system may cause the locking mechanisms to unlock.

Furthermore, while techniques and mechanisms disclosed herein generally are described in the context of securing luggage, the techniques and mechanisms disclosed herein may be employed in connection with any of a variety of portable or non-portable containers including, for example, shipping containers. Accordingly, other implementations are within the scope of the following claims.

The invention claimed is:

1. A piece of luggage comprising:
an enclosure;
an input device arranged at the enclosure, the input device configured to receive a representation for a credential from a client device;
a processing system housed within the enclosure, the processing system being configured to communicate over a network, the processing system being configured to:
receive the representation for the credential from the input device;
transmit a validation request to a server over the network, the validation request including data derived from the representation for the credential;
receive a validation response from the server over the network indicating that the credential is valid, and
upon receipt of the validation response, output an unlock signal;
a locking assembly arranged within the enclosure, the locking assembly comprising an actuator coupled to a locking device, the actuator being in communication with the processing system, and the locking device being configured to secure the enclosure;
wherein the actuator is configured to cause the locking device to unlock the enclosure upon receiving the unlock signal from the processing system.

2. The luggage of claim 1, wherein the actuator one or more linear solenoids.

3. The luggage of claim 1, wherein the locking device comprises one or more hasp-type locks.

4. The luggage of claim 1, wherein the enclosure comprises a briefcase.

5. The luggage of claim 1, wherein the input device comprises a microphone, and wherein the representation for the credential comprises a sound signal representing the credential.

6. The luggage of claim 1, wherein the input device comprises a wireless transceiver, and wherein the representation for the credential comprises a near-field communication signal representing the credential.

7. The luggage of claim 1, wherein the input device comprises an optical scanner, and wherein the representation for the credential comprises an optical machine-readable representation for the credential.

8. The luggage of claim 1, wherein the input device comprises a keypad, and wherein the representation for the credential comprises an alphanumeric code representing the credential.

9. The luggage of claim 1, wherein the processing system comprises another client device.

10. A computer-implemented method comprising:
receiving, at a processing system housed within a piece of luggage, a representation for a credential from a client device, wherein the processing system is configured to communicate over a network independent of communication with the client device;
transmitting, from the processing system and over the network, a validation request to a server, the validation request including data derived from the representation for the credential;
receiving, at the processing system and over the network, a validation response from the server indicating that the credential is valid, and
in response to receiving the validation response, outputting an unlock signal, wherein the unlock signal causes an actuator to unlock a locking device coupled to the luggage.

11. The method of claim 10, wherein receiving, at a processing system housed within a piece of luggage, a representation for a credential from a client device comprises receiving, from a microphone arranged at a piece of luggage, a sound signal representing the credential from a client device, and
wherein transmitting, from the processing system, a validation request to a server, the validation request including data derived from the representation for the credential comprises transmitting, from the processing system, a validation request to a server, the validation request including a set of alphanumeric characters derived from the sound signal.

12. The method of claim 10, wherein receiving, at a processing system housed within a piece of luggage, a representation for a credential from a client device comprises receiving, from a wireless transceiver arranged at a piece of luggage, a near-field communication signal representing the credential from a client device, and
wherein transmitting, from the processing system, a validation request to a server, the validation request including data derived from the representation for the credential comprises transmitting, from the processing system, a validation request to a server, the validation request including a set of alphanumeric characters derived from the near-field communication signal.

13. The method of claim 10, wherein receiving, at a processing system housed within a piece of luggage, a representation for a credential from a client device comprises receiving, from an optical scanner coupled to a piece of luggage, an optical machine-readable representation for the credential from a client device, and
  wherein transmitting, from the processing system, a validation request to a server, the validation request including data derived from the representation for the credential comprises transmitting, from the processing system, a validation request to a server, the validation request including a set of alphanumeric characters derived from the optical machine-readable representation.

14. The method of claim 10, wherein receiving, at a processing system housed within a piece of luggage, a representation for a credential from a client device comprises receiving, from a keypad arranged at a piece of luggage, an alphanumeric code for the credential, and
  wherein transmitting, from the processing system, a validation request to a server, the validation request including data derived from the representation for the credential comprises transmitting, from the processing system, a validation request to a server, the validation request including the alphanumeric code for the credential.

15. The method of claim 10, wherein receiving the representation for the credential from the client device comprises receiving a time-varying representation of the credential that is valid for a specific time period;
  wherein transmitting the validation request comprises transmitting a validation request including data derived from the time-varying representation for the credential during the specific time period that the representation is valid; and
  wherein receiving the a validation response indicating that the credential is valid comprises receiving.

16. The method of claim 10, wherein receiving the representation for the credential from the client device comprises receiving a representation that was provided to the client device over a network by a credential authority, the representation being generated based on first data associated with the credential;
  wherein transmitting the validation request comprises transmitting a validation request including data derived from the representation that was provided to the client device by a credential authority, the validation request being transmitted to a server that is configured to evaluate whether the credential is valid based on comparing the derived data with the first data associated with the credential.

17. The luggage of claim 1, wherein to transmit the validation request, the processing system is configured to transmit a validation request that includes an indication of the location of the luggage, the validation request being transmitted to a server configured to determine whether the indicated location is within an allowed geographic region where the luggage is allowed to be unlocked; and
  wherein to receive the validation response indicating that the credential is valid, the processing system is configured to receive an indication from the server that the indicated location is within the allowed geographic region.

18. The luggage of claim 1, wherein the processing system comprises a global positioning system (GPS) subsystem, and wherein the processing system is further configured to:
  determine geographic coordinates for the location of the luggage from the GPS subsystem; and
  provide the geographic coordinates to the server over the network.

19. The luggage of claim 1, wherein the processing system is further configured to:
  determine a location of the luggage; and
  determine that the location of the luggage is within an allowed geographic region where the luggage is allowed to be unlocked;
  wherein the processing system is configured to output the unlock signal in response to (i) receiving the validation response from the server over the network indicating that the credential is valid and (ii) determining that the location of the luggage is within an allowed geographic region; and
  wherein the processing system is configured to not output the unlock signal when the server does not indicate that the credential is valid or when the luggage is not determined to be within an allowed geographic region.

20. The luggage of claim 1, wherein the credential is a first credential of a first user, and wherein the processing system is configured to require validation of two different credentials of two different users to output the lock signal, the processing system being configured to:
  receive a representation for a second credential of a second user from the input device;
  transmit a second validation request to the server over the network, the second validation request including second data derived from the representation for the second credential; and
  receive a second validation response from the server over the network indicating that the second credential is valid;
  wherein the processing system is configured to output the unlock signal in response to (i) receiving a validation response indicating that the first credential is valid and (ii) receiving a validation response that the second credential is valid.

* * * * *